United States Patent Office 3,407,185
Patented Oct. 22, 1968

3,407,185
CRYSTALLINE ETHYLENE/BUTADIENE COPOLYMERS
Giulio Natta, Adolfo Zambelli, and Italo Pasquon, Milan, Italy, assignors to Montecatini Edison S.p.A., Milan, Italy, a corporation of Italy
Filed July 8, 1963, Ser. No. 293,427
Claims priority, application Italy, July 12, 1962, 13,949/62
10 Claims. (Cl. 260—85.3)

ABSTRACT OF THE DISCLOSURE

Crystalline linear ethylene/butadiene copolymers containing from 65 to 35% by mols of butadiene, comprising long sequences of butadiene units polymerized by trans-1,4 enchainment and alternating with ethylene units in the polymer chain, and characterized by X-ray diffraction spectrum having intensity peaks at angles $2\theta$ of 20.5° and 23.2° and an infrared spectrum having absorption bands at 8.27, 9.25 and 11.20 microns. Preparing foregoing polymers by contacting mixture of monomers with catalyst consisting of the reaction product of:

Figure 1:
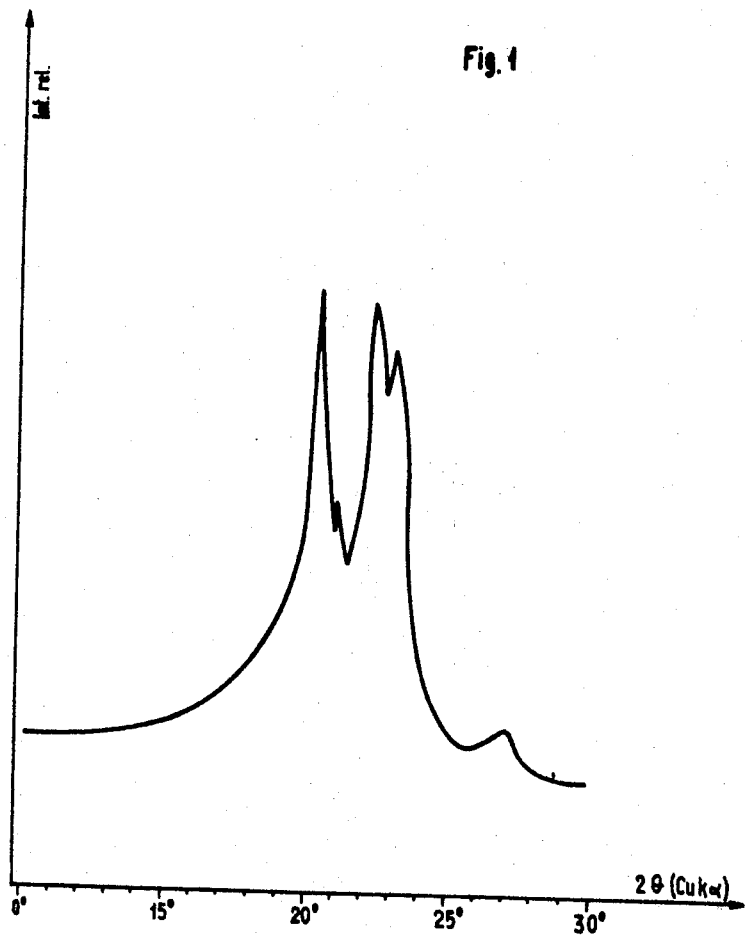

(a) a hydrocarbon soluble vanadium halide,
(b) a metallorganic aluminum compound having the general formula $AlR_3$, in which R is an alkyl radical containing from 1 to 10 carbon atoms,
(c) a weak Lewis' base having a heat of complexing with said metallorganic aluminum compound no greater than about 12,000 calories/mol, the molar ratio of vanadium halide to metallorganic aluminum compound being 1:2 and the preparation of the catalyst and the polymerization being carried out at temperatures lower than 0° C.

This invention relates to olefin copolymers and more particularly, to ethylene-butadiene copolymers showing a new type of crystallinity never before described in the literature. Moreover, this invention relates to a process for the preparation of these copolymers.

Heretofore, only very few types of crystalline ethylene-butadiene copolymers have been known. These were the copolymers of ethylene with low amounts of butadiene, which demonstrated the crystallinity of polyethylene only, and those copolymers rich in butadiene which demonstrated the crystallinity of one of the forms of polybutadiene. These copolymers had in general a statistical distribution of the different monomeric units.

It has now been found, and it is an object of this invention, that by copolymerizing ethylene and butadiene in the presence of particular catalytic complexes, which are only weakly active in the homopolymerization of butadiene, copolymers are obtained which show a new type of crystallinity. This new type of crystallinity is characterized by X-ray spectra and infrared spectra never heretofore shown by the analogous copolymers obtained by the heretofore known processes.

The catalytic systems utilized, according to the present invention, in the copolymerization of ethylene and butadiene consist of the reaction products of a hydrocarbon soluble vanadium compound, such as preferably a vanadium halide, a metallorganic aluminum compound having the general formula $AlR_3$, in which R is an alkyl radical containing 1 to 10 carbon atoms, and a preferably weak Lewis' base.

The best results are obtained by utilizing vanadium tetrachloride, with a molar ratio of the vanadium compound to the aluminum compound of 1:2, as a catalytic component.

The weak Lewis' bases utilized in the preparation of the catalyst are preferably selected from bases whose complexing heat, with the metallorganic compound, is equal to or is lower than 12,000 calories/mol. Among the weak Lewis' bases which one may utilize are, e.g., one of the bases belonging to the group consisting of diethyl ether, diisopropyl ether, diisobutyl ether, diphenyl ether, anisole, diphenyl sulphide, thiophene, N,N-diethylaniline and benzophenone.

The molar ratio of the vanadium compound to the complexing agent may vary between 1:1 and 1:5, with a molar ratio of 1:2 being preferably utilized.

Better results are obtained by adding an aluminum dialkyl monochloride, having the general formula $AlClR_2$ in which R is an alkyl radical containing 1 to 10 carbon atoms, to the catalytic system.

Both the catalyst preparation and the polymerization are carried out at temperatures lower than 0° C. The preparation of the catalyst is preferably carried out at temperatures between —50° C. and —100° C. and the polymerization at temperatures within the range of from about —10° to about —50° C.

The polymerization is preferably carried out in the presence of an aliphatic, cycloaliphatic or aromatic hydrocarbon solvent.

Figure 2:
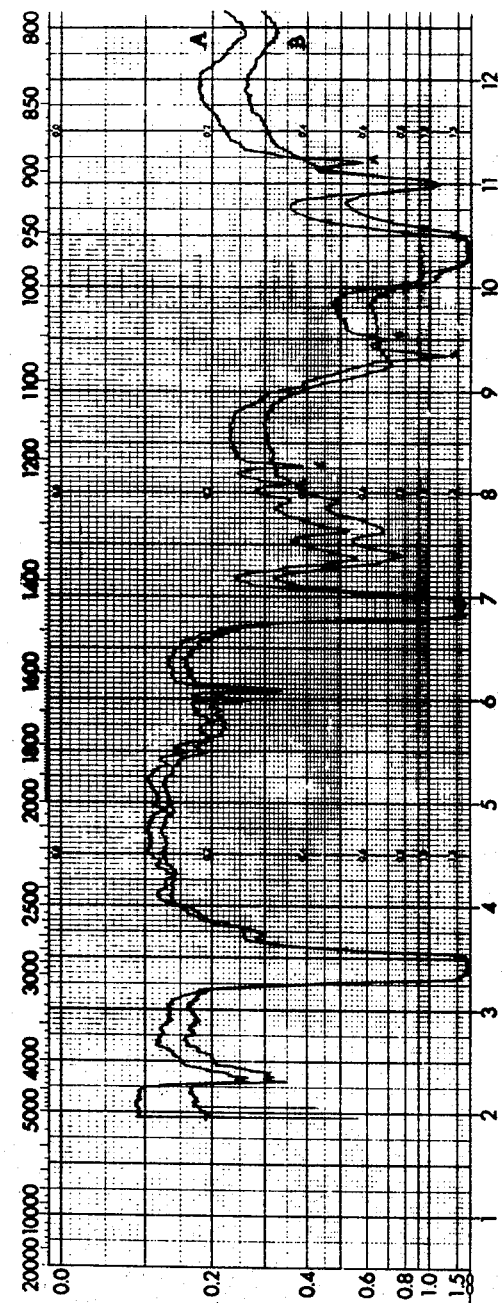

In the accompanying drawings are reported the X-ray diffraction spectrum, registered with a Geiger counter ($CuK\alpha$) (see FIGURE 1) and the infrared absorption spectrum of an ethylene-butadiene copolymer obtained by the process of this invention (see FIGURE 2).

In the X-ray spectrum (FIGURE 1), the diffraction intensity maxima at angles $2\theta$ of 20.5 and 23.2° are evident. These maxima are absent in the prior art copolymers and are the index of a crystallinity of a new type. This crystallinity, which is particularly evident in the copolymers containing 65 to 35% by mols of butadiene, disappears when these copolymers are heated to above 50–60° C. but reappears upon cooling.

This new type of crystallinity should be attributed to the presence of long sequences of butadiene units polymerized by trans-1,4-enchainment and alternated with ethylene units in the copolymer chain.

The structure of such a polymeric chain, corresponding to that of a poly-n-hexene-2-trans-omer, can be represented as follows:

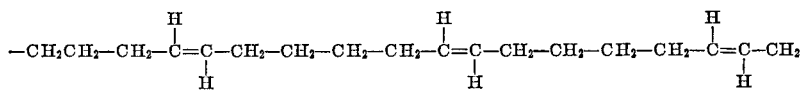

The infrared spectrum of the ethylene-butadiene copolymer of this invention shows absorption bands due to butadiene units prevailingly polymerized with 1,4-enchainment (see FIGURE 2). In FIGURE 2, line A represents the spectrum determined at room temperature while line B represents the spectrum of the molten polymer. Some bands, as can be observed by comparing spectra A and B, disappear by melting the product and are therefore an index of crystallinity. The weaker bands at 8.10, 9.50 and 12.95 microns are characteristic of the crystallinity due to trans-1,4-polybutadiene while other bands, at 8.27, 9.25 and 11.20 microns, are characteristic of the crystallinity of the new type of copolymer described above and are not present in the spectra of any other heretofore known ethylene-butadiene copolymers.

The characteristic bands of the new type crystallinity, cannot be observed in the copolymers obtained with catalytic systems having a composition different from that described above or by operating at temperatures above 0° C. For instance, by copolymerizing ethylene and butadiene with a catalytic system in which the molar ratio of the vanadium compound to the aluminum trialkyl is 1:4 instead of 1:2, the other operating conditions remaining the same, the copolymer obtained does not show the aforedescribed new type of crystallinity. Analogously, by operating at room temperature instead of at temperatures lower than 0° C., the product obtained does not show the crystallinity of the aforedescribed type.

The alternate enchainment of the units of both monomers in the new ethylene-butadinene copolymers is demonstrated by the fact that by subjecting them to oxidation a product is obtained in which high percentages of adipic acid are present.

The copolymers of the present invention can be used, e.g., in the field of elastomers. More particularly, the copolymers having a low crystallinity content, by vulcanization with the mixes commonly utilized in the vulcanization of unsaturated rubbers, give products having good mechanical characteristics.

The following examples will further illustrate the invention and are not intended to limit its scope.

EXAMPLE 1

$2 \times 10^{-3}$ mols of $VCl_4$, $4 \times 10^{-3}$ mols of anisole, $4 \times 10^{-3}$ mols of $Al(iC_4H_9)_3$, $4 \times 10^{-3}$ mols of $Al(iC_6H_9)_2Cl$, 200 cc. of toluene and 80 g. butadiene are introduced under nitrogen into a 500-cc. glass reactor provided with an agitator and kept at −78° C.

The reactor is then heated to −25° C. and ethylene is introduced. After 1 hour, 27 g. of polymer are obtained. This polymer, purified from the catalyst, shows in its X-ray spectrum diffraction peaks at angles $2\theta$ of 20.5° and 23.2° (CuKα), which are the index of a new type of crystallinity. A weak peak at 22.5°, attributable to trans-1,4-polybutadiene is also present in the X-ray spectrum.

The crude polymer is extracted with boiling ethyl ether and from it are obtained 24 g. of partially crystalline polymer which crystallinity is of the new type according to the teachings of this invention.

1.5 g. of product are then obtained by extraction of the residue to the ether extraction with boiling n-hexane, whose X-ray diffraction spectrum is reported in FIGURE 1. In this spectrum, in addition to the new type of crystallinity, there can also be observed a weak crystallinity due to trans-1,4-polybutadiene. The crystallinity of the new type disappears by melting above 50–60° C. but reappears after cooling.

The infrared spectrum of the hexane extract is reported in FIGURE 2. It shows bands due to ethylene units and bands due to butadiene units polymerized with a prevailingly 1,4-enchainment. Bands which disappear by melting the product (compare spectra A and B) are also present and are the index of crystallinity.

The weakest bands at 8.10, 9.5 and 12.95 microns are characteristic of the crystallinity due to trans-1,4-polybutadiene while the bands at 8.27, 9.25 and 11.20 microns are characteristic of the new type of crystallinity.

EXAMPLE 2

21 g. of a polymer which gives X-ray and infrared spectra similar to those of the polymer of Example 1, are obtained by operating under the conditions and with the ingredients of Example 1 except for utilizing $4 \times 10^{-3}$ mols of $Al(C_2H_5)_3$ instead of $4 \times 10^{-3}$ mols of $Al(iC_4H_9)_3$.

EXAMPLE 3

11 g. of a polymer which gives X-ray and infrared spectra similar to those of the polymer of Example 1, are obtained by operating under the conditions and with the ingredients of Example 1 except for utilizing $4 \times 10^{-3}$ mols of ethyl ether instead of anisole as the complexing agent.

EXAMPLE 4

An unsaturated copolymer completely amorphous by X-ray examination is obtained by operating as in Example 1, except for utilizing $6 \times 10^{-3}$ instead of $4 \times 10^{-3}$ mols of $Al(iC_4H_9)_3$.

EXAMPLE 5

An unsaturated copolymer which appears to be completely amorphous by X-ray examination is obtained by operating as in Example 1, except for carrying out the preparation of the catalyst and the polymerization at 0° C. instead of −25° C.

EXAMPLE 6

By operating as in Example 1, but in the absence of $Al(iC_4H_9)_2Cl$, 2 g. of product are obtained which show maxima of diffraction intensity at 20.5 and 23.2°, upon X-ray examination.

EXAMPLE 7

The same procedure of Example 1 is repeated with the exception that radioactive ethylene (containing $C_{14}$ as a tracer) is used as the comonomer.

The product obtained is submitted to fractional extraction in a Kumagawa extractor by using a series of solvents having different boiling points and by operating at different extraction times. Following this procedure, 7 fractions have been obtained.

For each of said fractions the following characteristics have been determined:

(1) The molar percentage of ethylene (radiochemical analysis),
(2) The crystallinity index (as determined by X-ray analysis),
(3) The molar ratio (between 1,4-trans double bonds and vinyl groups).

The results obtained are shown in Table 1 below. From these results one may note that the maximum of crystallinity is reached when the ethylene content in the copolymer is of about 50% by mols.

TABLE 1

| Fraction | Extraction | | | Analysis | | |
|---|---|---|---|---|---|---|
| | Solvent | Extraction time (hrs.) | Percent (by weight) of product extracted | Radiochemical | X-rays [a] | Infrared |
| | | | | Mols percent of ethylene | Crystallinity index | 1,4-trans/vinyl groups molar ratio |
| 1 | Ethyl ether | 60 | 75.6 | 28.3 | 0.12 | 3.78 |
| 2 | do | 44 | 3.39 | 37.4 | 0.29 | 9.14 |
| 3 | do | 24 | 0.44 | 42.2 | 0.34 | 11 |
| 4 | n-Pentane | 48 | 1.2 | 50.6 | 0.41 | 14.3 |
| 5 | do | 24 | 0.35 | 44.7 | 0.41 | 20.3 |
| 6 | n-Hexane | 40 | 8.53 | 45 | [b] | 14.8 |
| 7 | Residue | | 10.9 | 78 | [c] | 9.9 |

[a] The analysis was carried out with the aid of a Philips spectrogoniometer by using $CuK\alpha$ rays. The crystallinity index is defined as $I=\frac{A_1+A_2}{A}$ wherein $A_1$ is the surface between the contour line of the crystallinity peak having a maximum of diffraction intensity at $2\theta$ of $20.5°$ and the continuous line of the diffraction intensity of the amorphous portion of the copolymer, interpolated between the intersection points of the contour line of the peak with the line of the diffraction intensity of the amorphous portion. $A_2$ is the surface of the peak having a maximum of diffraction intensity at $2\theta$ of $23.2°$ determined with the same procedure used for $A_1$. $A$ is the total surface between the contour line of the diagram 1/2 and the straight base line obtained by connecting the asymptote values of the diffraction intensities at low angles ($2\theta$ of $3°$) and high angles ($2\theta$ of $40°$). The value of the I ratio is directly related to the percentage of crystalline product having as characteristic the maxima of diffraction intensity at $2\theta$ of $20.5°$ and $23.2°$. I is 0 for completely amorphous products and 1 for completely crystalline products.

[b] The hexane fraction also shows, besides the maxima of diffraction intensity at $2\theta$ of $20.5$ and $23.2°$, the maxima of diffraction intensity which are characteristic for crystalline 1,4-trans-polybutadiene and for crystalline polyethylene. It is not possible, therefore, to determine the copolymer crystallinity index even if the crystallinity appears to be high.

[c] The product shows substantially only polyethylene type crystallinity

Variations can of course be made without departing from the spirit of the invention.

What is claimed is:

1. A crystalline linear copolymer of ethylene and butadiene containing from 65 to 35% by mols of butadiene and characterized by an X-ray diffraction spectrum having intensity peaks at angles $2\theta$ of $20.5°$ and $23.2°$ and by an infrared spectrum having absorption bands at 8.27, 9.25 and 11.20 microns, said polymer comprising long sequences of butadiene units polymerized by trans-1,4-enchainment and alternating with ethylene units in the polymer chain.

2. A process for preparing a crystalline linear copolymer of ethylene and butadiene, containing from 65 to 35% by mols of butadiene, which has an X-ray diffraction spectrum having intensity peaks at angles $2\theta$ of 20.5 and 23.2° and an infrared spectrum having absorption bands at 8.27, 9.25 and 11.20 microns, which process comprises contacting a mixture of said monomers with a catalyst consisting of the reaction product of:

(a) a hydrocarbon soluble vanadium halide,
   (b) a metallorganic aluminum compound having the general formula $AlR_3$, in which R is an alkyl radical containing from 1 to 10 carbon atoms,
   (c) a weak Lewis' base having a heat of complexing with said metallorganic aluminum compound no greater than about 12,000 calories/mol, the molar ratio of vanadium halide to metallorganic aluminum compound being 1:2, and the preparation of the catalyst and the polymerization being carried out temperatures lower than 0° C.

3. The process of claim 2 wherein the vanadium halide is vanadium tetrachloride.

4. The process of claim 2 wherein the molar ratio of vanadium halide to Lewis' base is between 1:1 and 1:5.

5. The process of claim 4 wherein the molar ratio of vanadium halide to Lewis' base is 1:2.

6. The process of claim 2 wherein the Lewis' base is selected from the group consisting of diethyl ether, diisopropylether, diisobutylether, diphenylether, anisole, diphenyl sulfide, thiophene, N,N-diethylaniline, and benzophenone.

7. The process of claim 2 wherein the catalytic system further includes a metallorganic aluminum compound having the general formula $AlR_2Cl$, in which R is an alkyl group containing 1 to 10 carbon atoms.

8. The process of claim 2 wherein the preparation of the catalyst is carried out at a temperature between $-50$ and $-100°$ C.

9. The process of claim 2 wherein the polymerization is carried out at a temperature between $-10$ and $-50°$ C.

10. The process of claim 2 wherein the polymerization is carried out in the presence of an aliphatic, cycloaliphatic or aromatic hydrocarbon solvent.

References Cited

UNITED STATES PATENTS 3,228,918  1/1966  Tocker _____ 260—85.3
3,116,274  12/1963  Boehm et al. _____ 260—94.9

FOREIGN PATENTS 795,370  5/1958  Great Britain.

OTHER REFERENCES

Natta et al.: Stereospecific Polymerization of Conjugated Diolefins, Chim. e Industr. 41, 1959. Article found in Stereospecific Catalyst and Stereoregular Addition Polymer A Collection of the original papers by G. Natta, vol. IV, article No. 129, pages 1–7.

JOSEPH L. SCHOFER, *Primary Examiner.*

R. BENJAMIN, *Assistant Examiner.*